(12) United States Patent
Cartabbia

(10) Patent No.: US 7,490,651 B2
(45) Date of Patent: Feb. 17, 2009

(54) APPARATUS FOR FINISHING GARMENT FABRIC EDGES

(75) Inventor: Giovanni Cartabbia, Palazzolo sull'Oglio (IT)

(73) Assignee: MACPI S.p.A. Pressing Division, Palazzolo Sull'oglio (Brescia) (IT)

( * ) Notice: Subject to any disclaimer, the term of this patent is extended or adjusted under 35 U.S.C. 154(b) by 334 days.

(21) Appl. No.: 11/142,922

(22) Filed: Jun. 2, 2005

(65) Prior Publication Data

US 2005/0274460 A1  Dec. 15, 2005

(30) Foreign Application Priority Data

Jun. 10, 2004  (IT) .......................... MI2004A1168

(51) Int. Cl.
*B32B 37/00* (2006.01)
(52) U.S. Cl. ................. 156/358; 156/359; 156/461; 156/497; 156/498; 156/499; 156/510; 156/555; 156/582

(58) Field of Classification Search ................. 156/497, 156/498, 499, 544, 553, 554, 555, 580, 582, 156/583.1, 358, 359, 443, 459, 461, 468, 156/475, 494, 510
See application file for complete search history.

(56) References Cited

U.S. PATENT DOCUMENTS 5,662,767 A * 9/1997 Getz et al. .................. 156/498
6,789,592 B2 * 9/2004 Biro et al. ................... 156/391

* cited by examiner

*Primary Examiner*—James Sells
(74) *Attorney, Agent, or Firm*—James V. Costigan; Hedman & Costigan, P.C.

(57) ABSTRACT

The present invention relates to an apparatus for finishing the edge of a garment fabric and the like, including, on a bearing framework, a guide element for guiding an adhesive strip, leading to a top wheel and a bottom wheel.

Said top and bottom wheels operate, at a base defining a working surface, on an edge portion of a fabric to apply the adhesive strip thereto.

Heating means for heating the adhesive strip and cooling means for cooling the made piece are moreover provided.

12 Claims, 22 Drawing Sheets

FIG 14
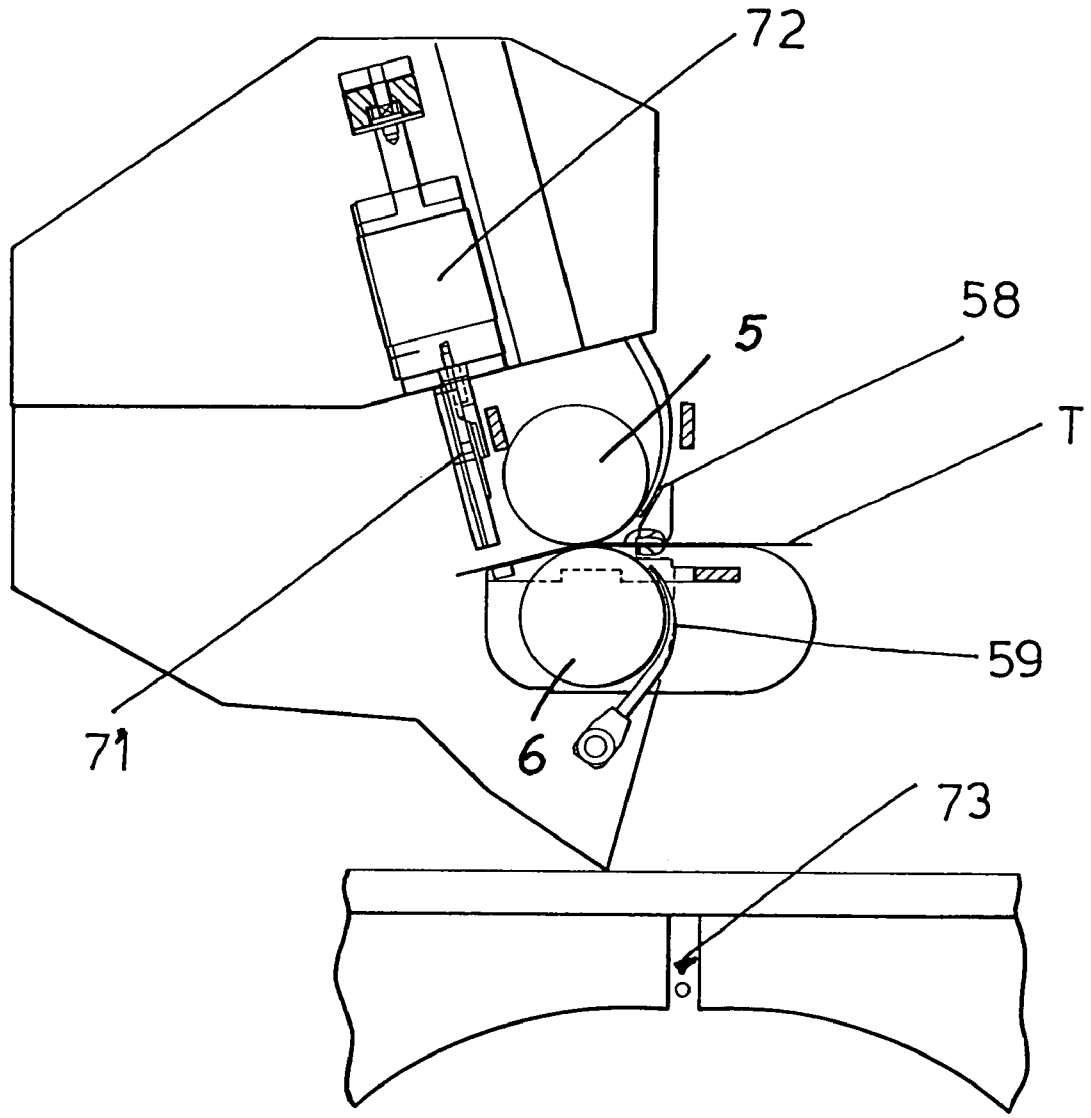
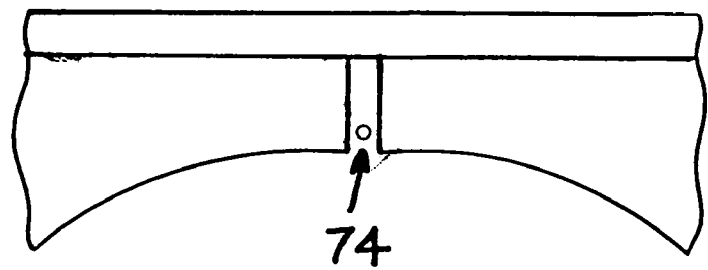

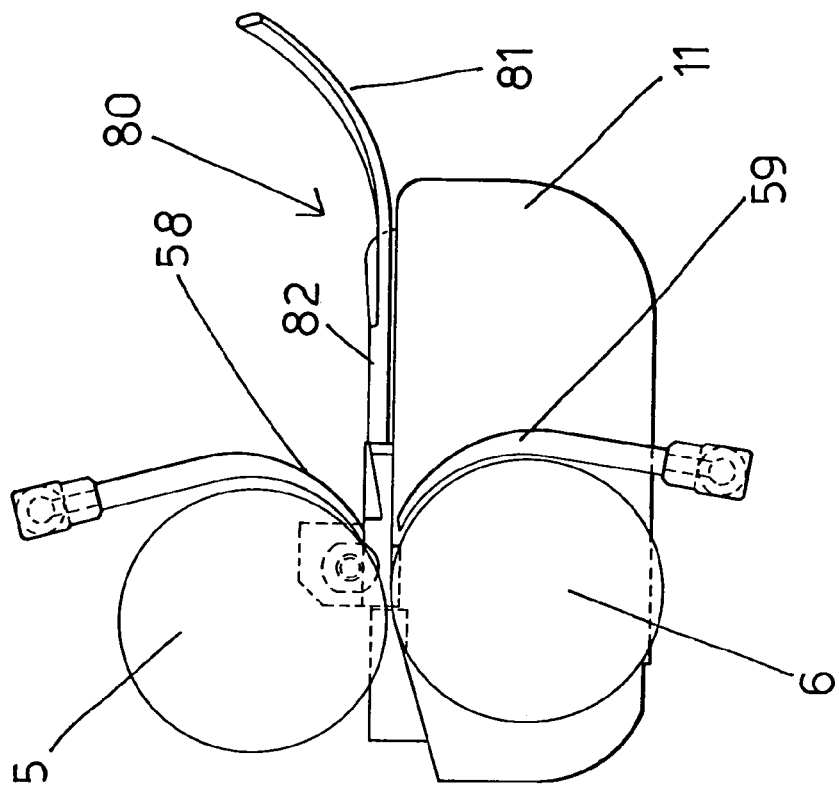
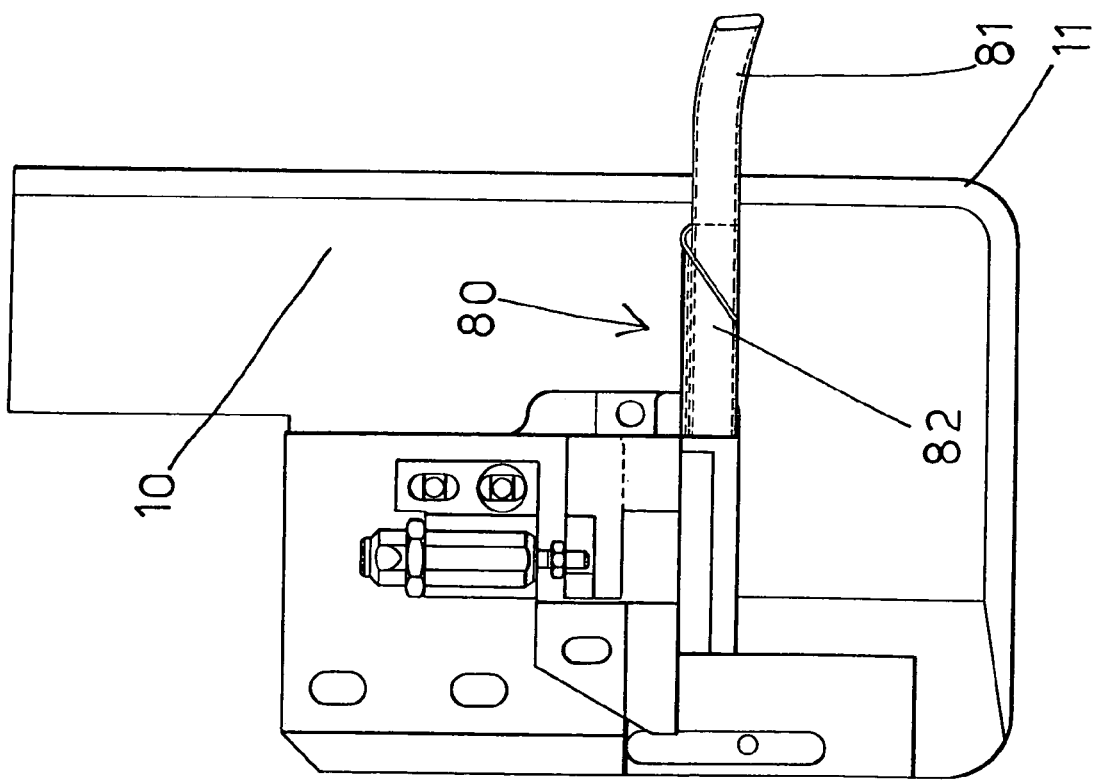
FIG 15
FIG 16

FINISHING SYSTEMS
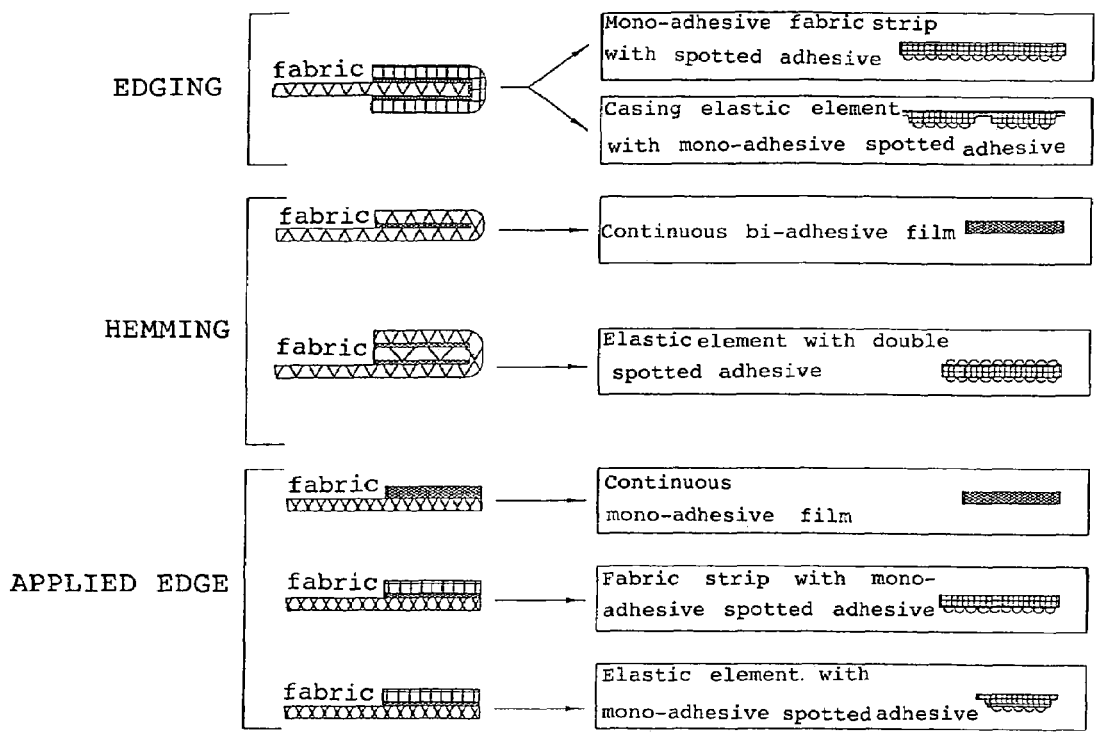
FIG. 34
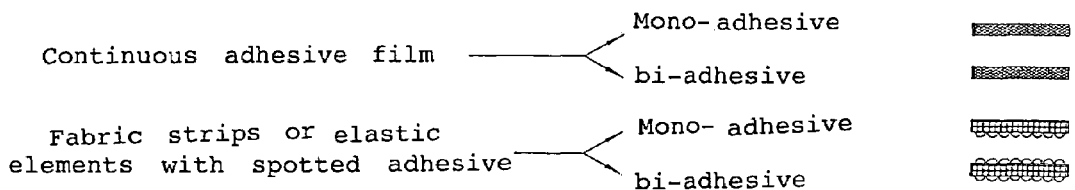
APPARATUS
Single base apparatus for performing three types of finishings
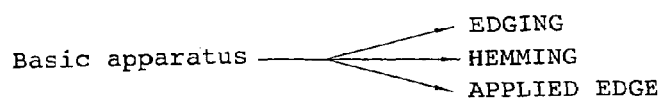

APPARATUS FOR FINISHING GARMENT FABRIC EDGES

BACKGROUND OF THE INVENTION

The present invention relates to an apparatus for finishing the edge portion of a fabric for garments and the like.

As is known, in the garment article making field it is frequently necessary to stabilize the edges of a garment fabric, to prevent the fabric from being damaged at the edge portions thereof.

Prior approaches for solving the above mentioned problem, however, are frequently very complex construction-wise and, moreover, they do not allow to easily optimize the connection.

Because of the above mentioned reasons, the provision of the finishing element is such as to modify the typical characteristics of the fabric.

SUMMARY OF THE INVENTION

Accordingly, the aim of the present invention is to overcome the above mentioned drawbacks, by providing an apparatus for finishing the edge portions of garment article fabric materials and the like, which allows to perfectly finish the fabric edge portions, independently from the fabric type, without using seams or seamed connections.

Within the scope of the above mentioned aim, a main object of the invention is to provide such an apparatus allowing to easily and quickly perform finishing operations, without modifying the elastic characteristics of the fabric and other used materials.

Yet another object of the present invention is to provide such an apparatus allowing to easily and quickly perform finishing operations, by carrying out edging, rim-finishing and flat application operations, so as to allow a user skin to be always contacted by a textile material and not by a plastics material.

Yet another object of the present invention is to provide such an apparatus for finishing garment article fabric edge portions which, owing to its specifically designed features, is very reliable and safe in operation.

According to one aspect of the present invention, the above mentioned aim and objects, as well as yet other objects, which will become more apparent hereinafter, are achieved by an apparatus for finishing garment fabric edges, characterized in that said apparatus comprises, on a bearing framework, a guide element for guiding an adhesive strip leading to a top wheel and a bottom wheel, said top and bottom wheels operating, at a base defining a working surface, on an edge portion of a fabric material for applying said adhesive strip thereto, heating means for heating said adhesive strip and cooling means for cooling a made article being moreover provided.

BRIEF DESCRIPTION OF THE DRAWINGS

Further characteristics and advantages of the present invention will become more apparent hereinafter from the following detailed disclosure of a preferred, though not exclusive, embodiment of an apparatus for finishing edge portions of fabric materials in garments and the like, which is illustrated, by way of an indicative, but not limitative, example in the accompanying drawings, where:

FIG. 14 is a schematic view showing the strip cutting means;

FIG. 15 is a top plan view of the hemming device included in the apparatus according to the invention;

FIG. 16 is an elevation view showing that same hemming device;

FIG. 34 schematically illustrates a general diagram of the operations and procedures for applying several fabric or resilient material or bi-adhesive film strips to a textile article of manufacture, to finish an edge of a fabric material without performing seam operations and with a very reduced or minimum thickness.

DESCRIPTION OF THE PREFERRED EMBODIMENTS

Figure 1:
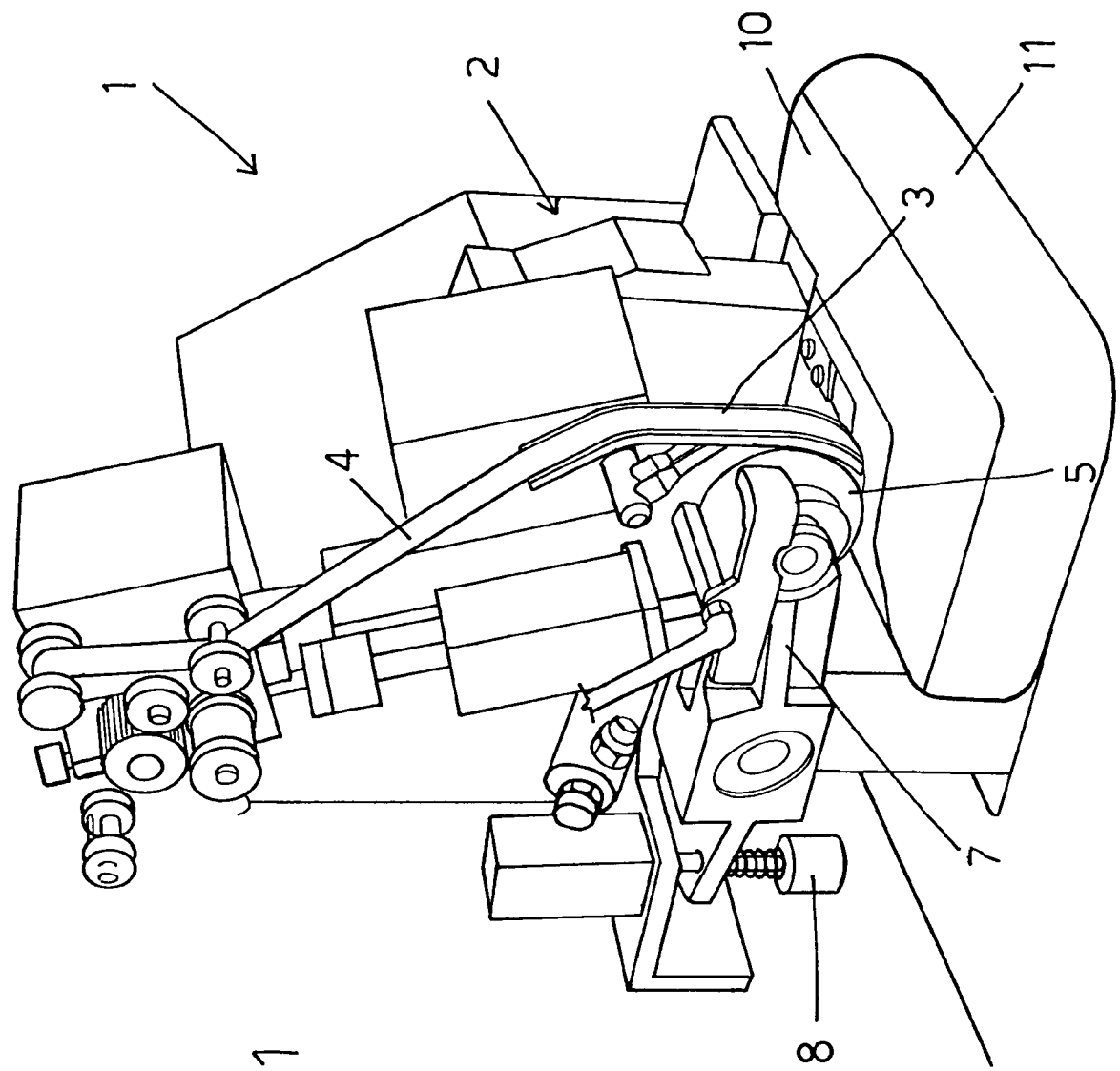
FIG. 1 is a schematic perspective view illustrating the finishing apparatus according to the invention.

With reference to the number references of the above mentioned figures, the apparatus for finishing fabric edge portions in making cloth or garment articles and the like, which has been generally indicated by the reference number 1, comprises a bearing framework 2, supporting a guide element 3 for guiding an adhesive strip, generally indicated by the reference number 4, which is supplied, through a feeding assembly, from an adhesive strip delivery bobbin or roll.

More specifically, the adhesive strip guide 3 is arranged, with its outlet end portion, at a top wheel 5 and a bottom wheel 6, therebetween the fabric material, generally indicated by T, which must be subjected to finishing operations, is caused to pass.

In particular, said top and bottom wheels 5 and 6 are coupled by driving motors.

More specifically, said top wheel 5 is supported by a swinging lever 7, affected by a driving piston 8, thereby allowing said lever to be raised and lowered and thereby adjusting the pressure applied by the top wheel 5.

As shown, said top and bottom wheels 5 and 6 are arranged in a mutual contact relationship, at a working surface 10, defined by a base or bottom 11 on which workpieces are supported.

In particular, the above disclosed apparatus is adapted to perform several types of treatments or processing operations.

Figure 2:
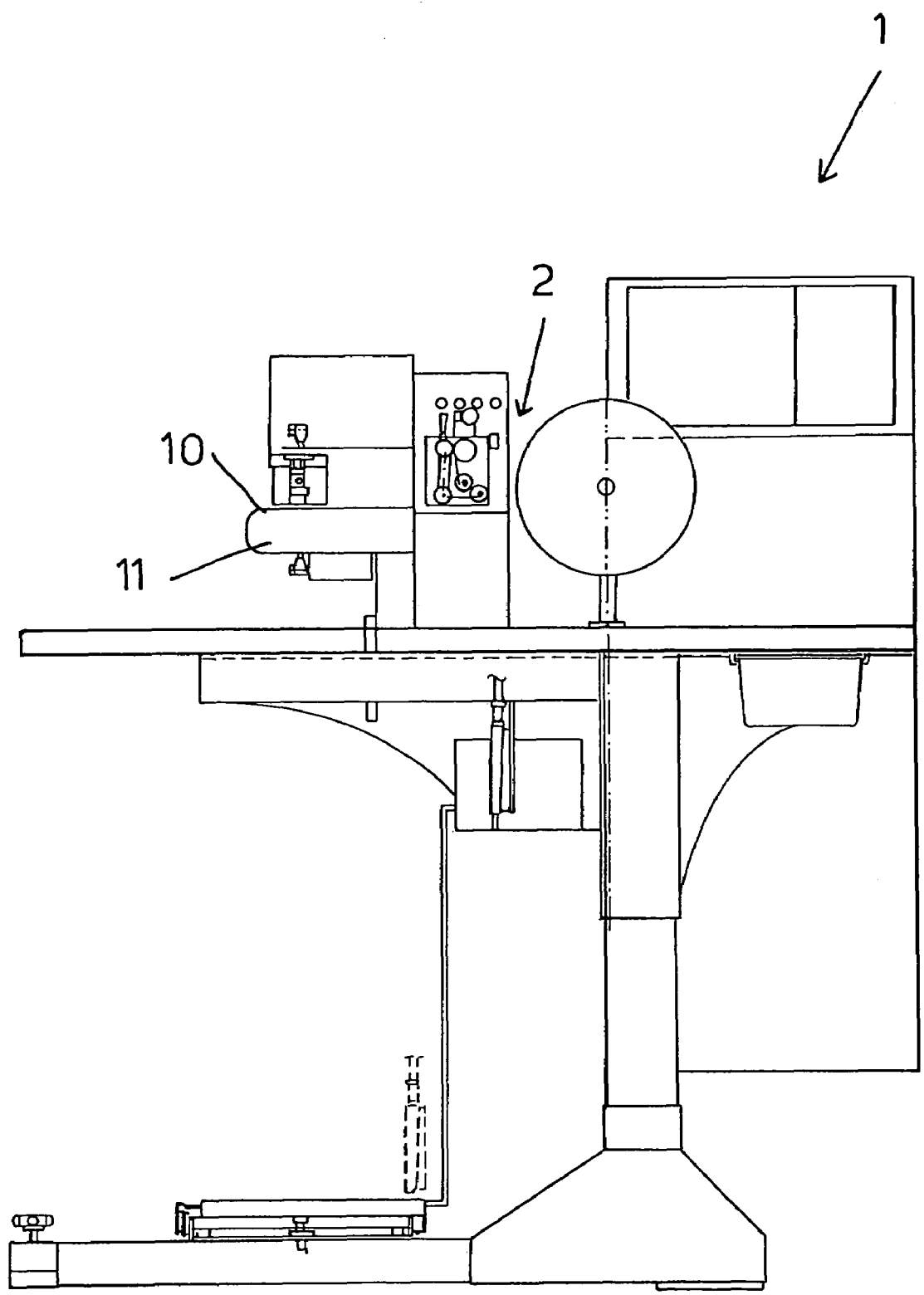
FIG. 2 is a front elevation view showing the edging apparatus according to the invention.
Figure 3:
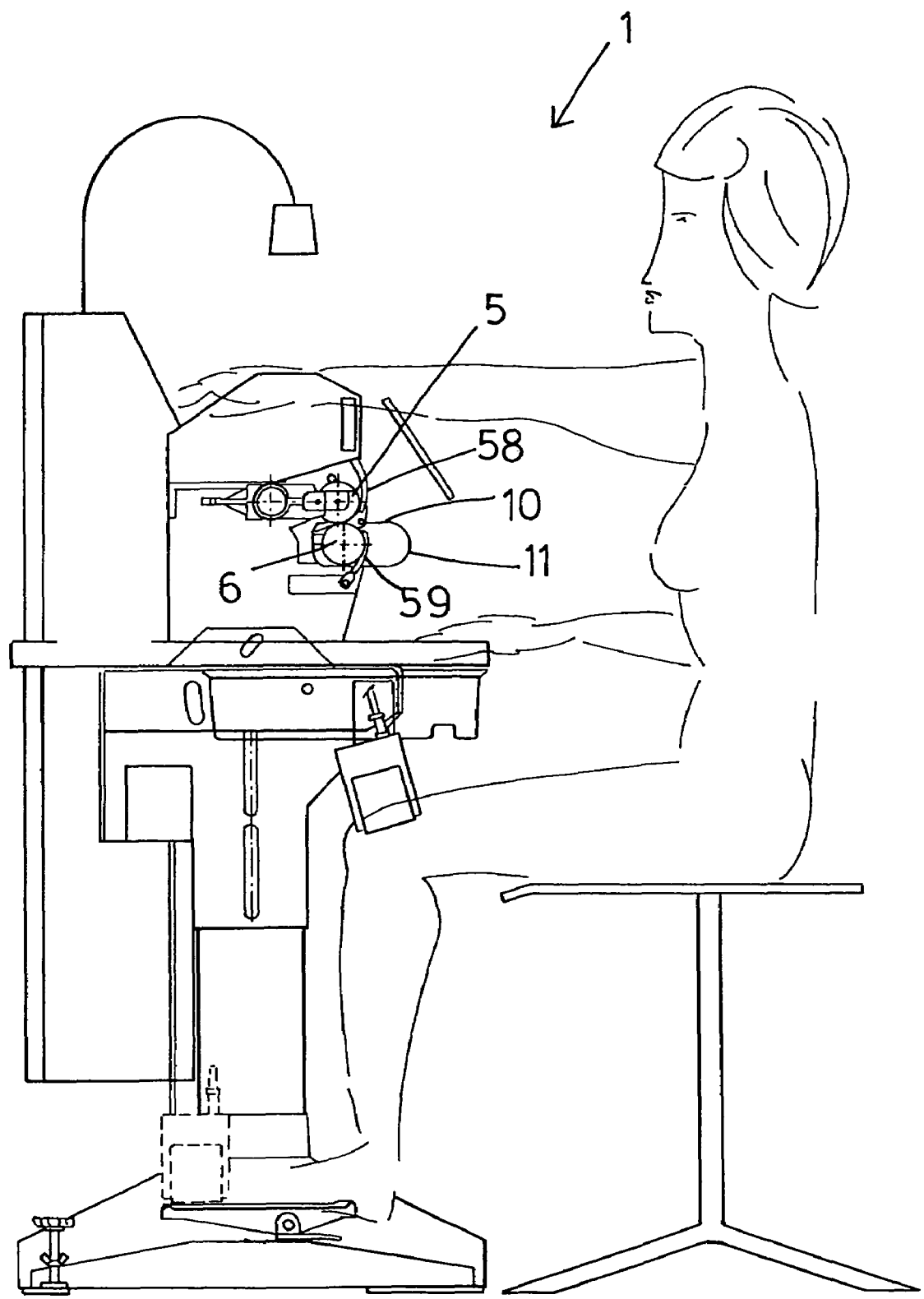
FIG. 3 is a further elevation view showing the edging apparatus according to the invention.
Figure 4:
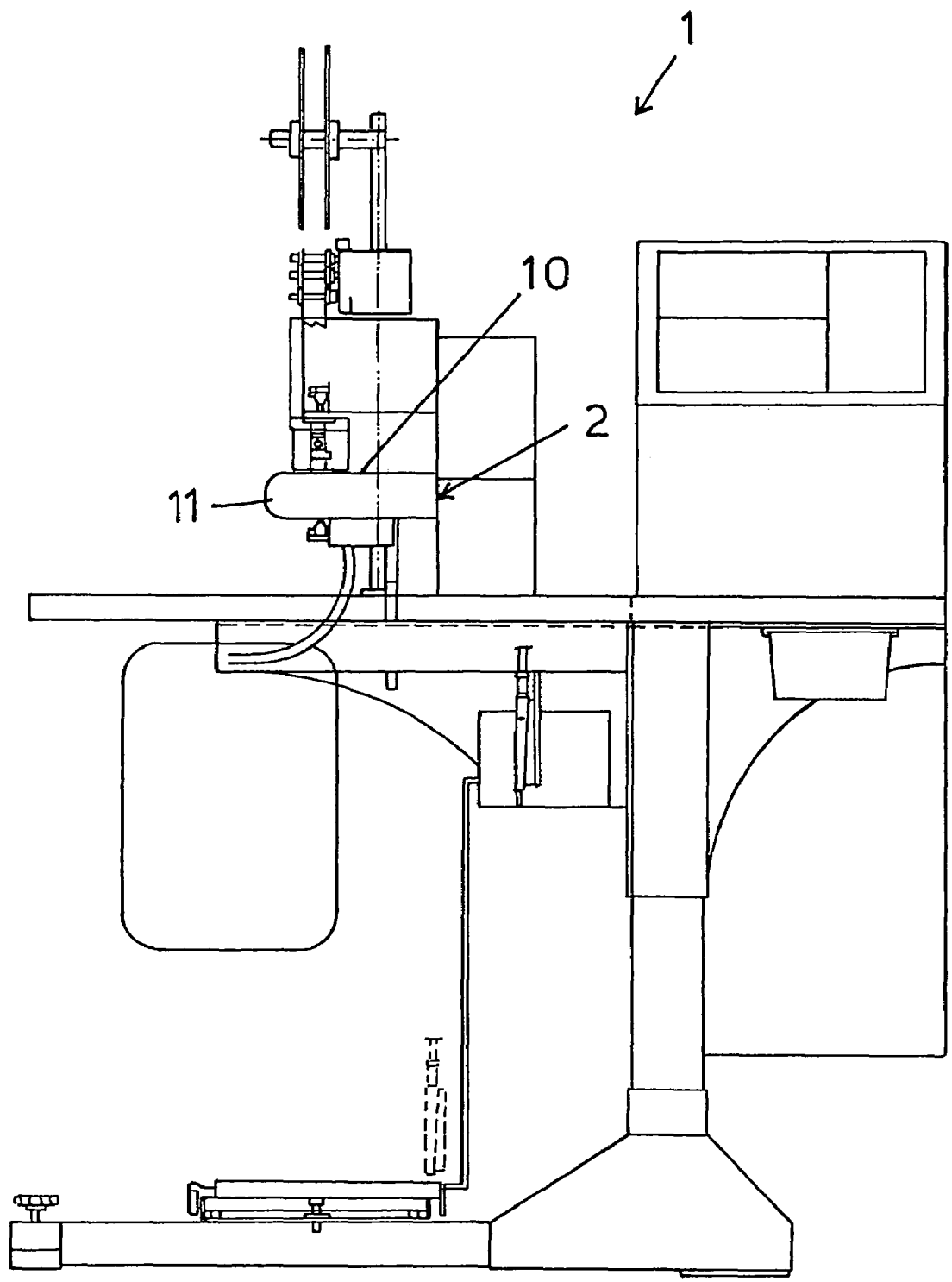
FIG. 4 is a schematic front elevation view showing the edging finishing apparatus according to the present invention.
Figure 5:
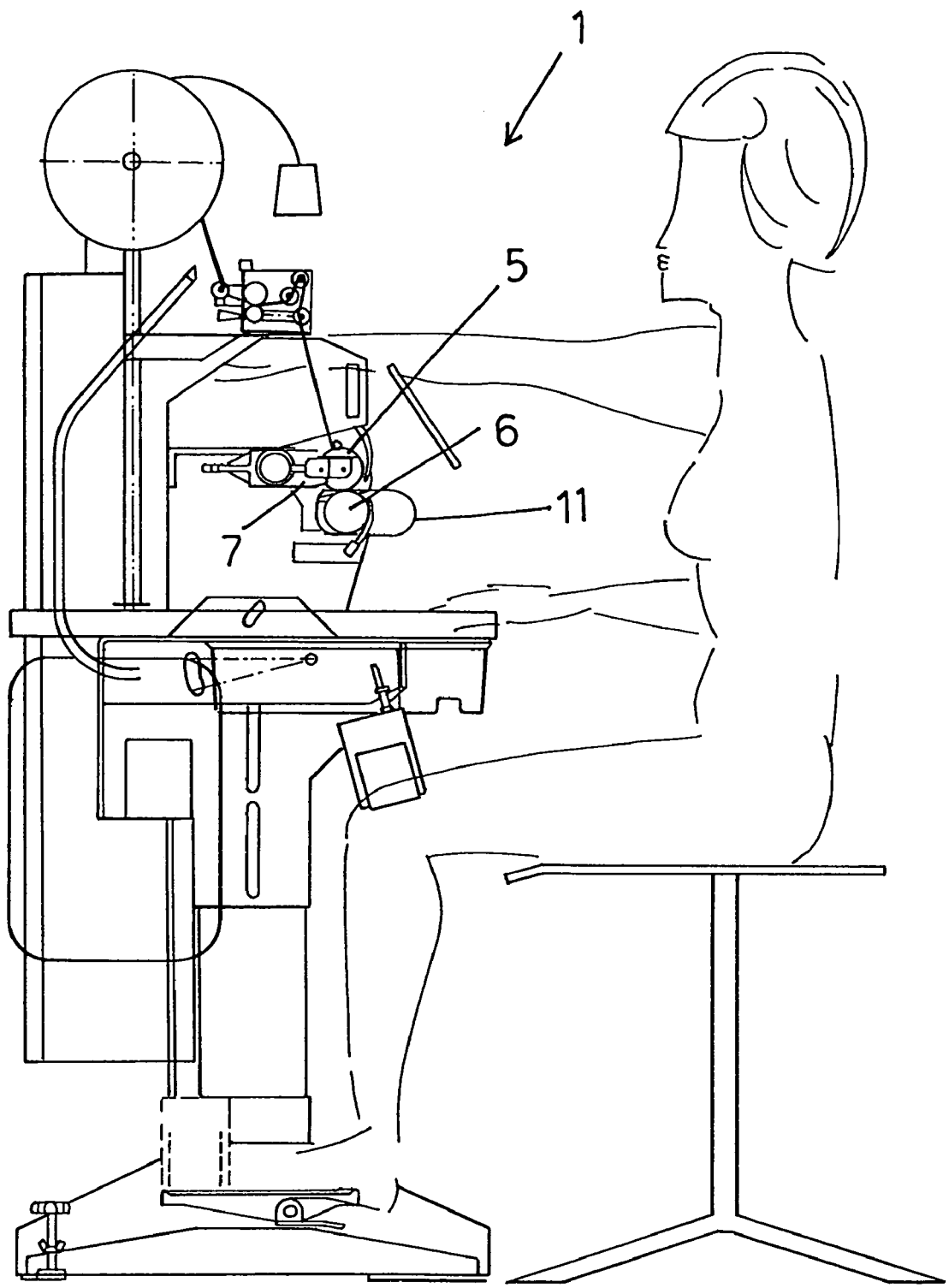
FIG. 5 is a side elevation view illustrating the edging apparatus according to the invention.
Figure 6:
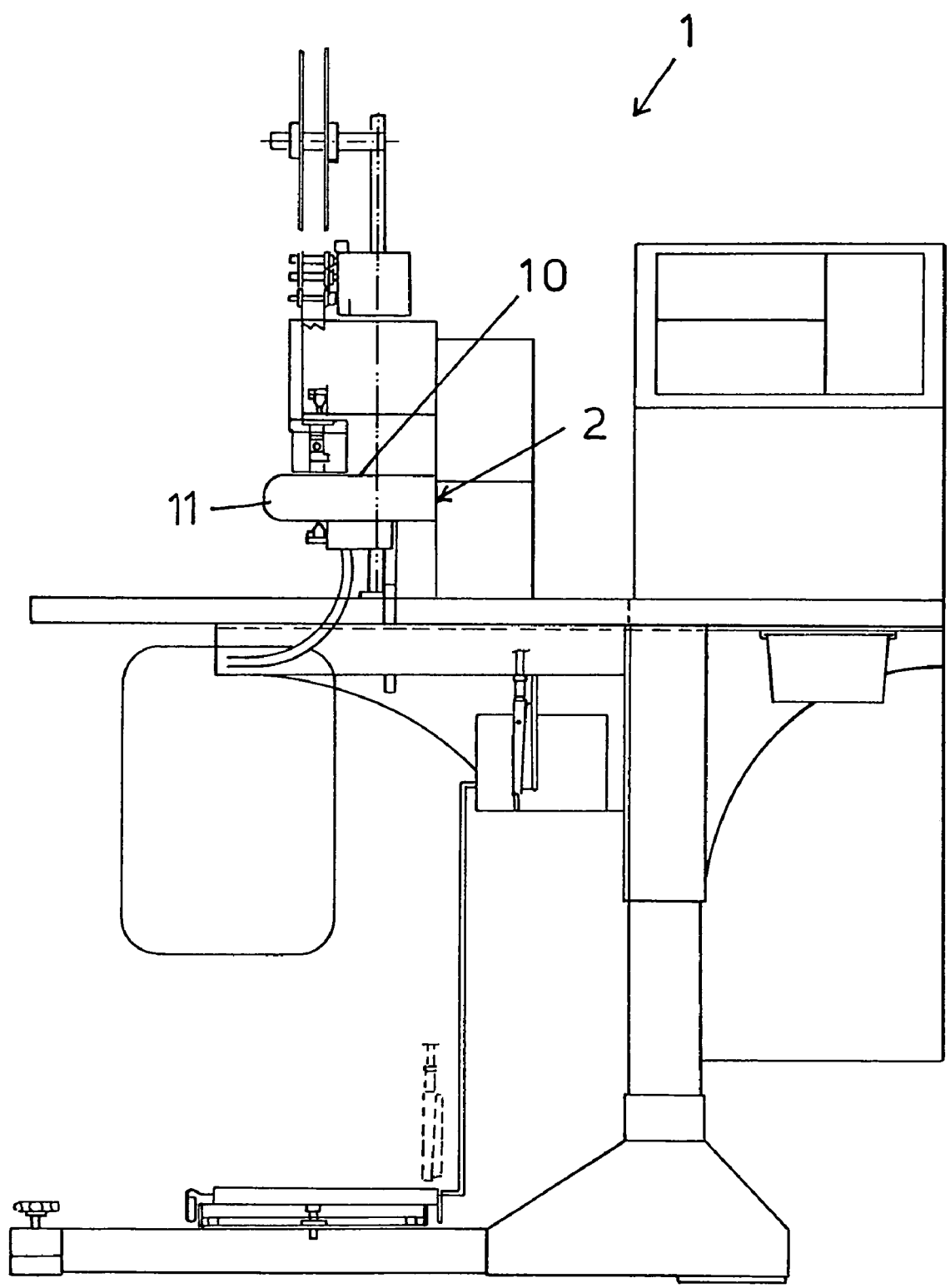
FIG. 6 is a further front elevation view showing the finishing apparatus allowing a strip to be flat applied.
Figure 7:
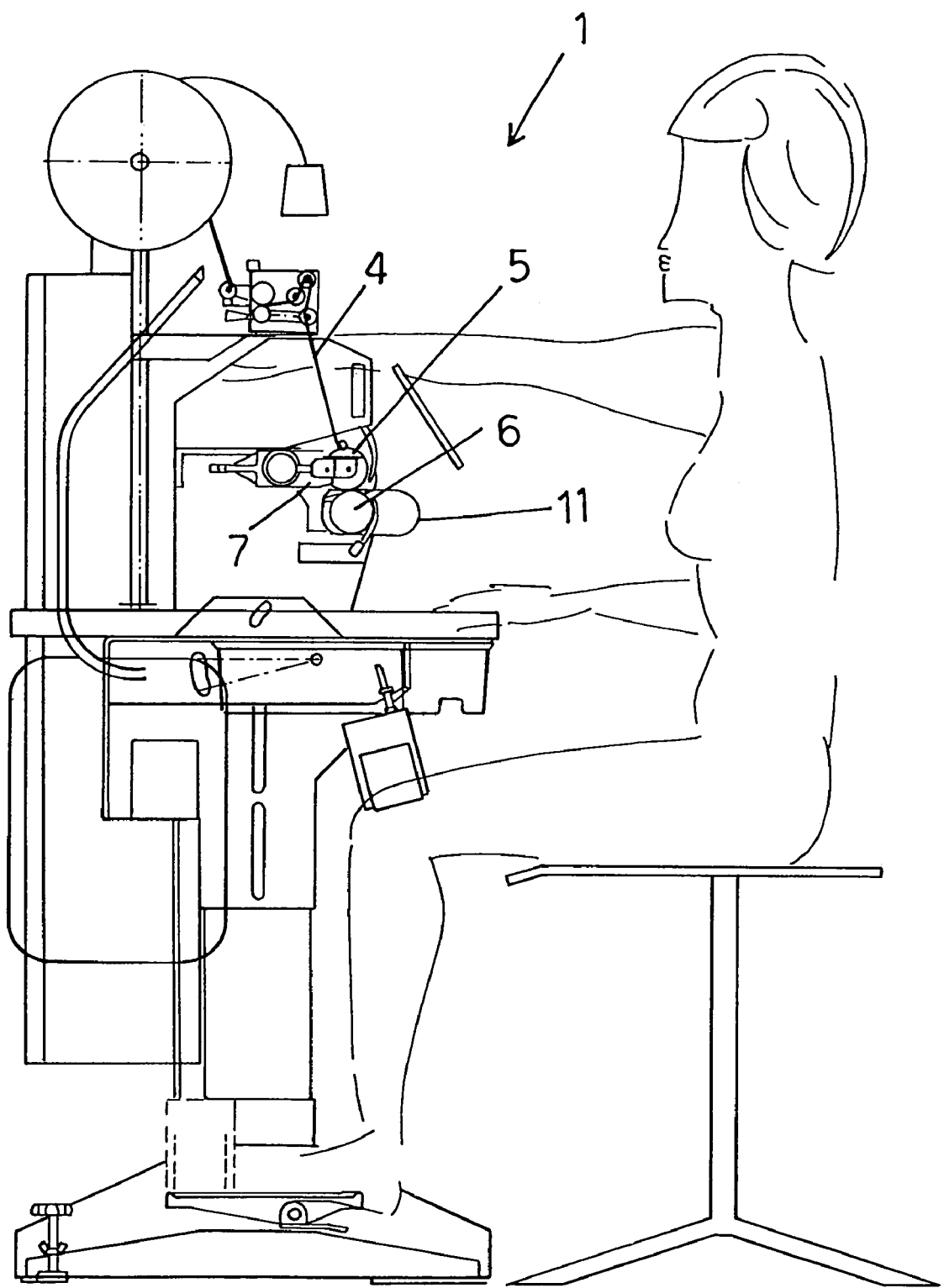
FIG. 7 is a side elevation view showing the apparatus or machine for flat applying an adhesive strip.

In particular, the apparatus, as shown in FIGS. 2 and 3, is designed for performing an edging operation, by using a strip which can comprise a single-adhesive fabric strip 20, which is so folded as to bridge the fabric material T, thereby correspondingly covering its edge portions.

Figure 22:
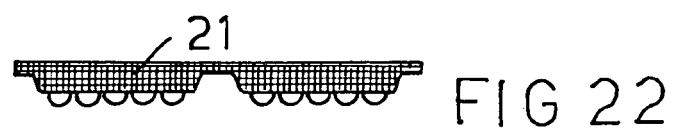
FIG. 22 illustrates a hemming or edging strip including a casing strip.

It is also possible to perform the edging operations by using a single-adhesive casing strip 21, as clearly shown in FIG. 22.

If the subject apparatus is used for performing a hemming operation, then the fabric material T is folded, as it will be disclosed in a more detailed manner hereinafter, at the edge portion.

Figure 23:
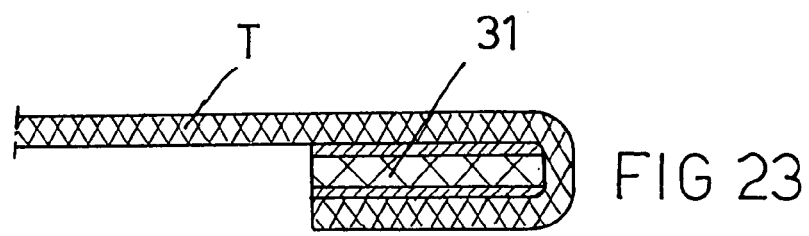
FIG. 23 schematically shows the hemming operation performed by a bi-adhesive resilient element.
Figure 24:
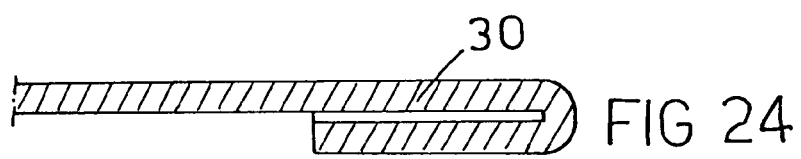
FIG. 24 shows the hemming operation performed by a bi-adhesive film.

Moreover, a further strip comprising a bi-adhesive film 30 is also applied, as is shown in FIG. 24, or a bi-adhesive resilient element 31 being herein used, as is clearly shown in FIG. 23.

Figure 25:
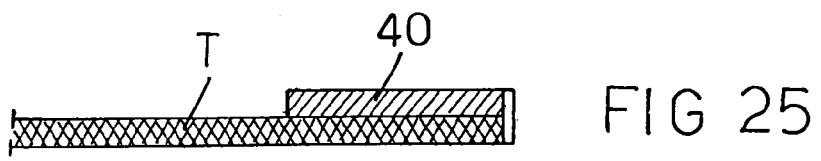
FIG. 25 shows a flat application operation performed by trimming a mono-adhesive film.
Figure 26:
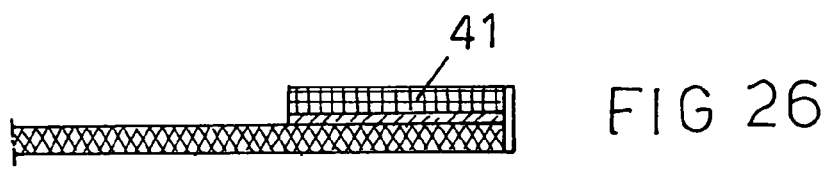
FIG. 26 schematically shows a flat application operation performed by trimming and applying a mono-adhesive fabric material.

If the subject finishing machine is designed for flat applying said adhesive strip, then it is possible to apply to the fabric material T, as is clearly shown in FIG. 25, a single-adhesive film 40 or, optionally, a single or mono-adhesive fabric material 41, as is shown in FIG. 26.

In the above mentioned two situations, it is herein provided a trimming assembly, for performing cutting operations, which will be disclosed in a more detailed manner hereinafter.

Figure 27:
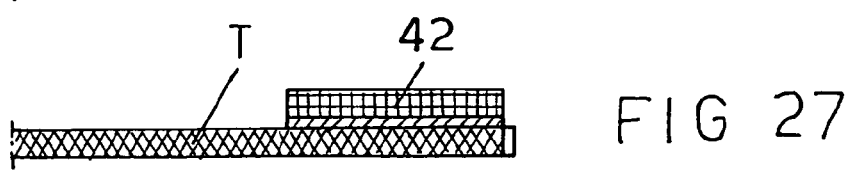
FIG. 27 schematically shows a flat application and trimming of a single fabric for applying a mono-adhesive resilient or elastic element.
Figure 28:
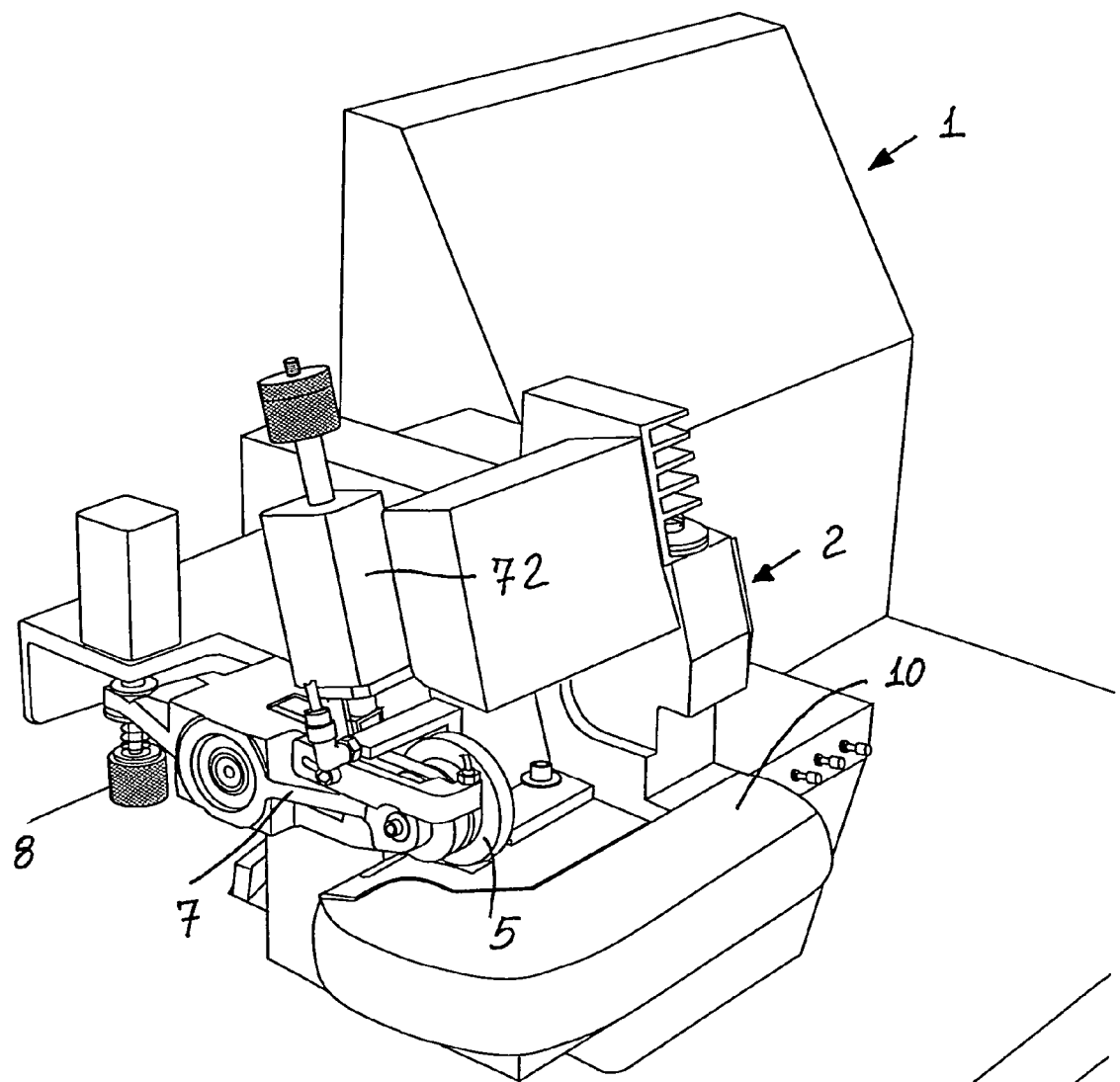
FIG. 28 is a side perspective view showing the basic apparatus or machine.
Figure 29:
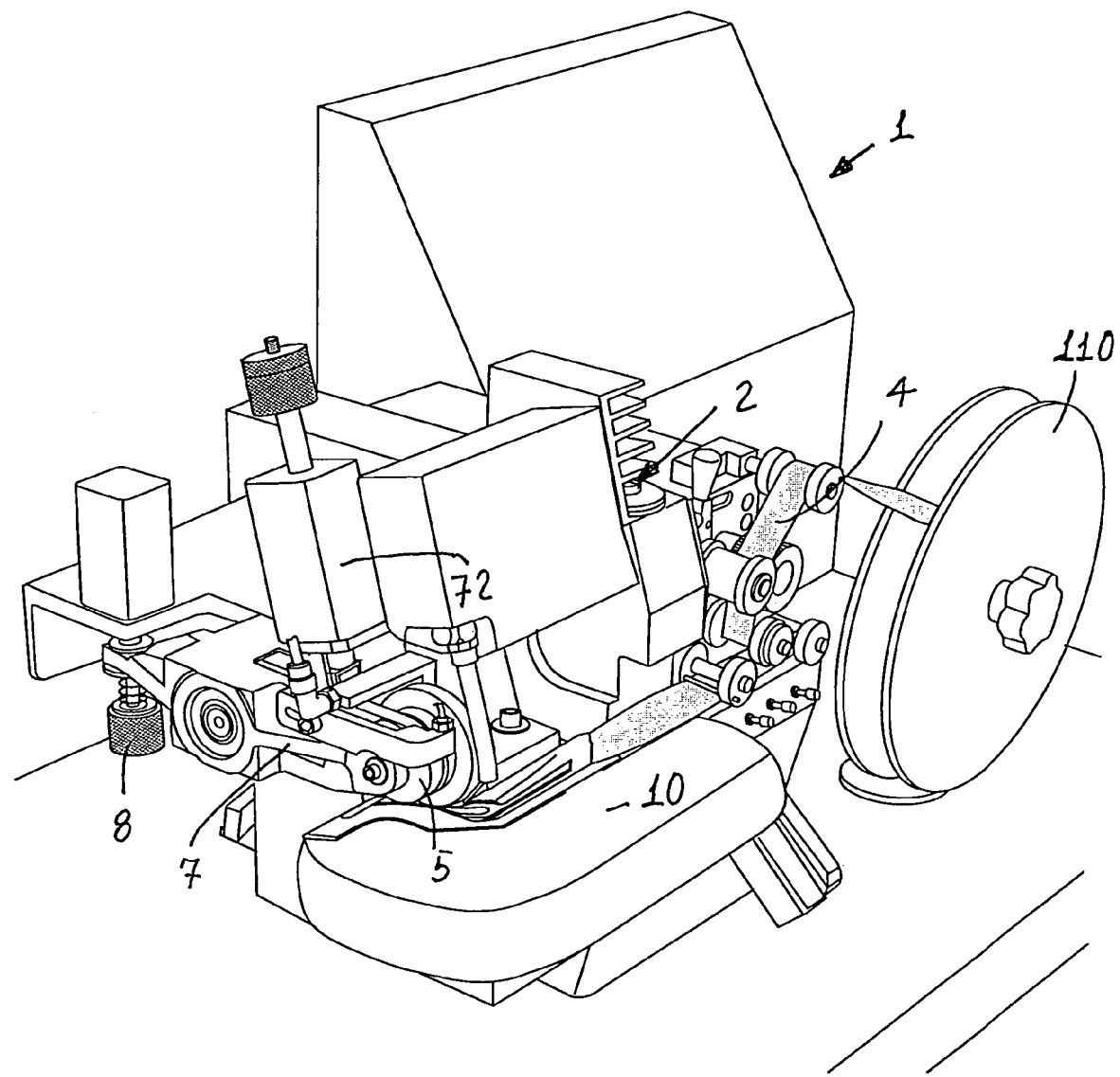
FIG. 29 shows several fittings associated to the above apparatus for allowing said apparatus to easily and quickly perform edging or hemming operations.
Figure 30:
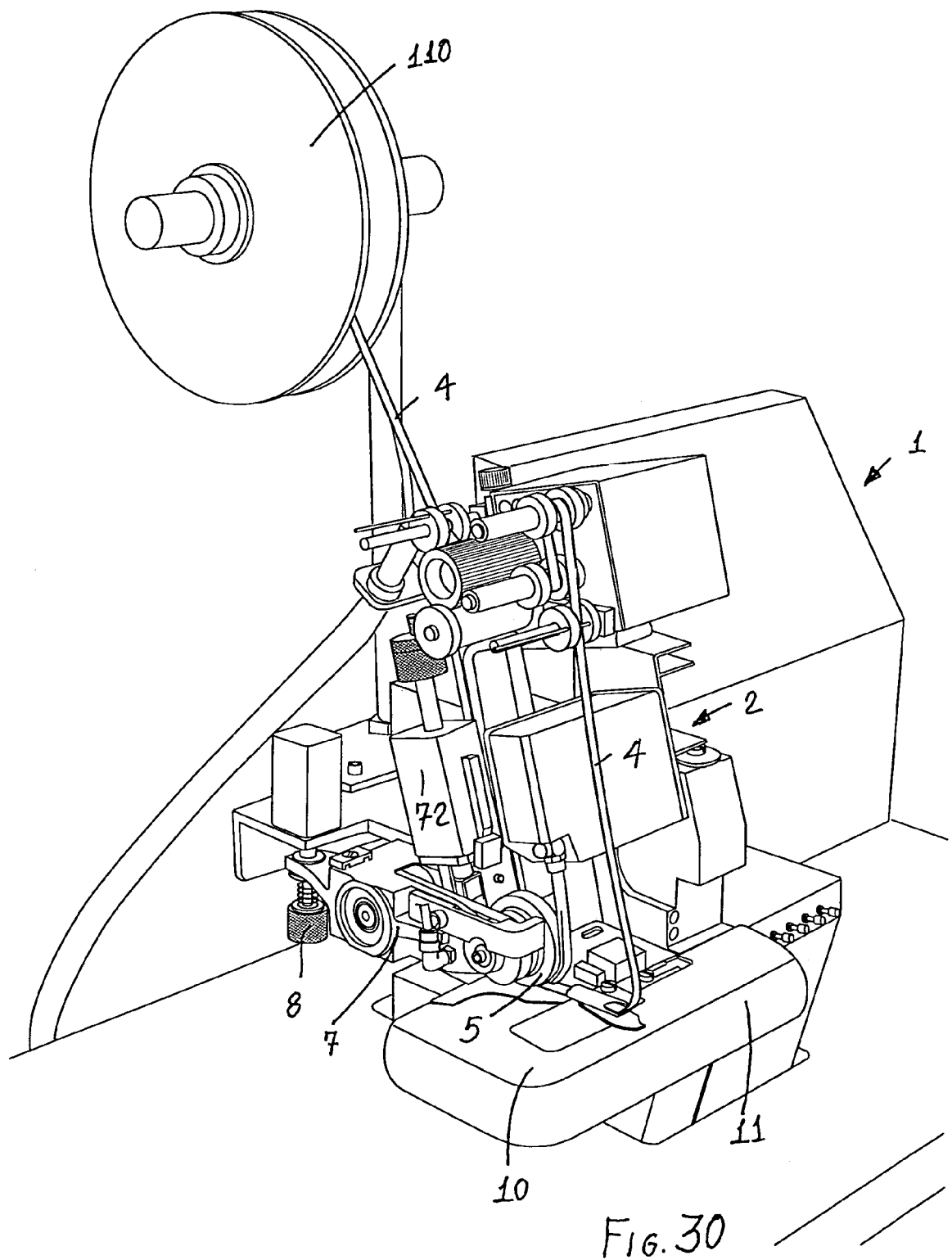
FIG. 30 schematically shows that same basic apparatus, including a plurality of fittings for performing hemming operations.
Figure 31:
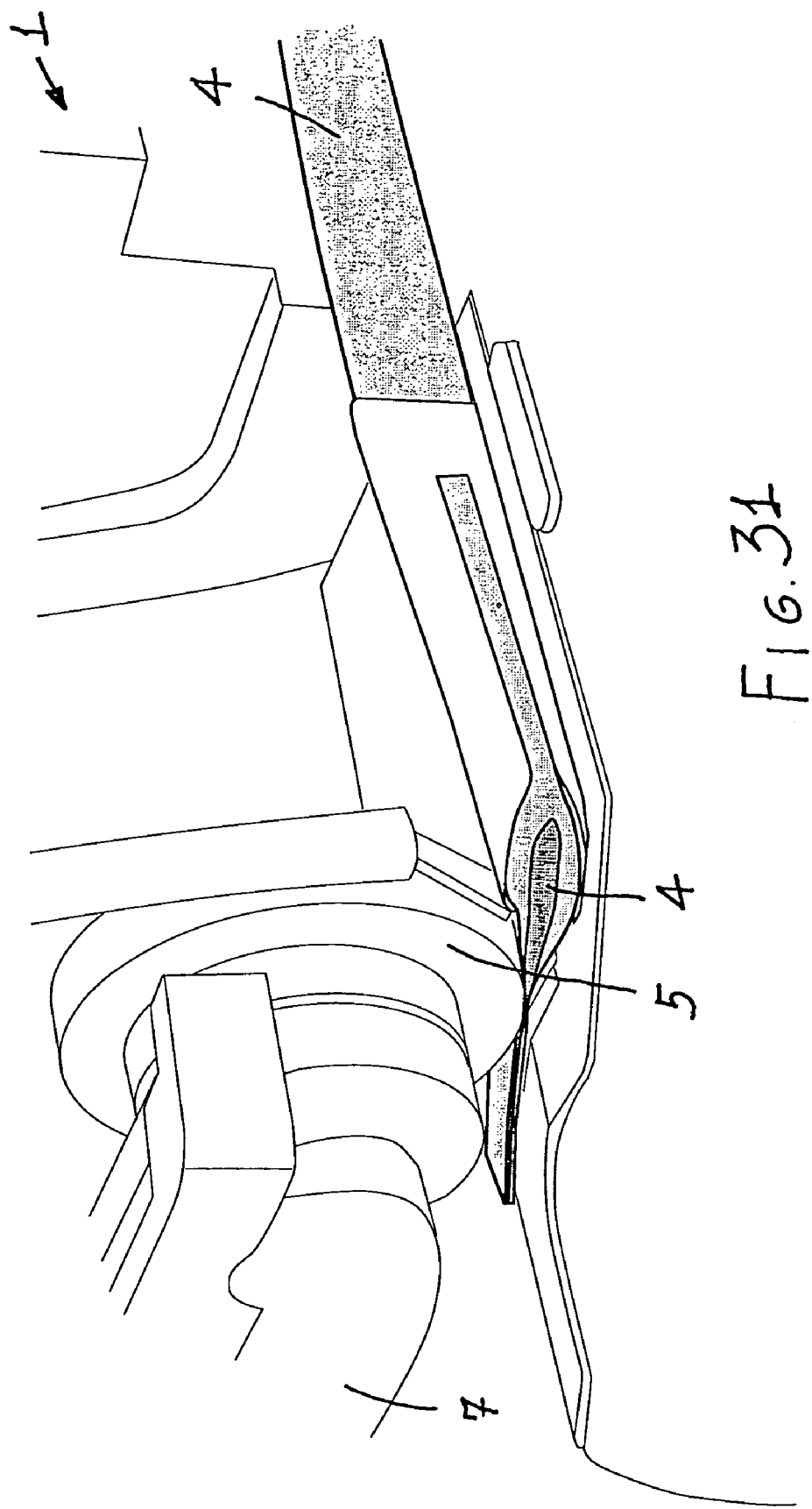
FIG. 31 is a detail view, on an enlarged scale, showing the operating elements for performing edging operations, by using the basic apparatus shown in FIG. 29.

FIG. 27 schematically shows the application of a single-adhesive resilient strip 42, and, in this case, the trimming operation will exclusively affect the fabric material.

Figure 8:
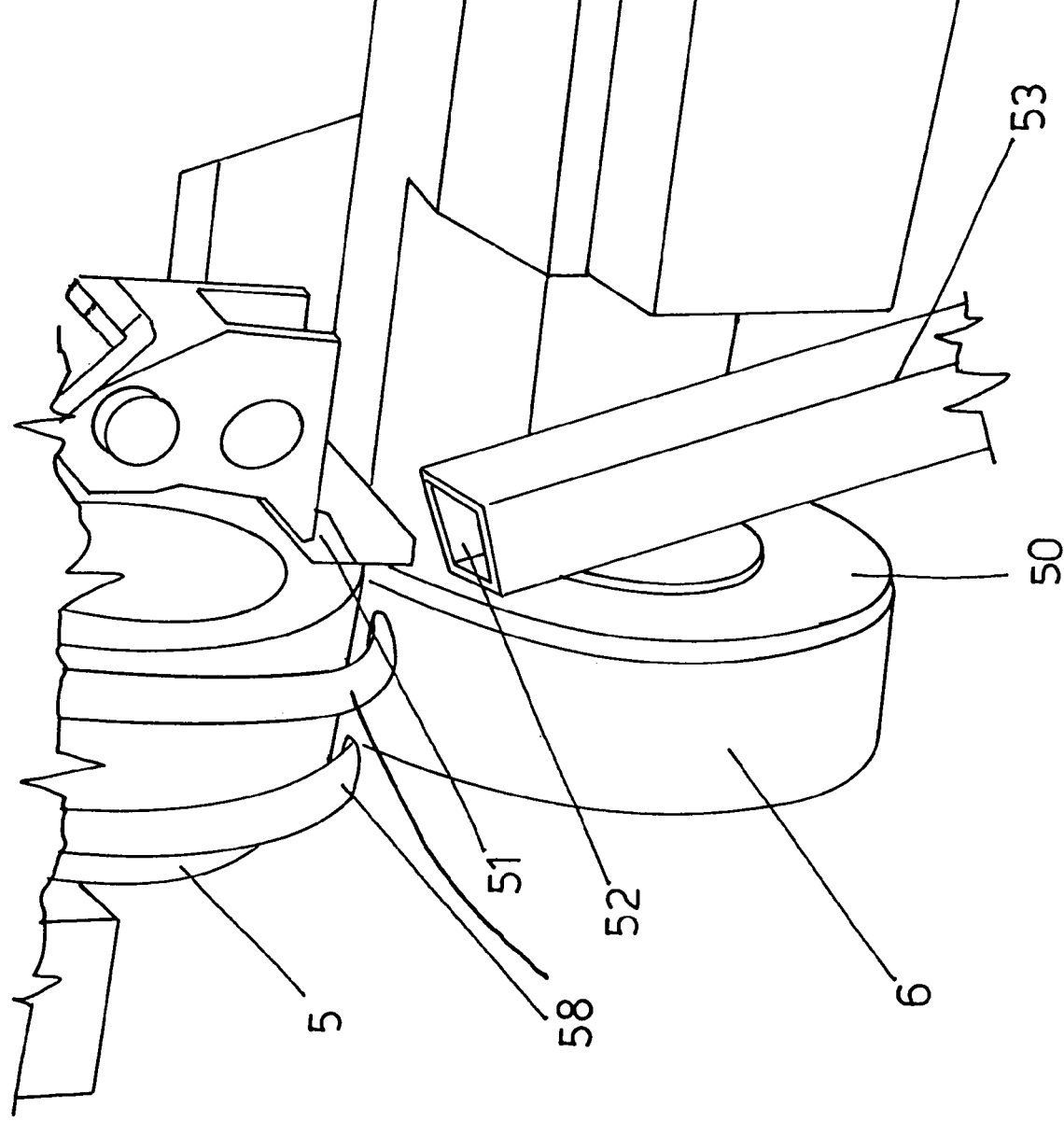
FIG. 8 is a schematic perspective view illustrating trimming means included in the inventive apparatus.
Figure 9:
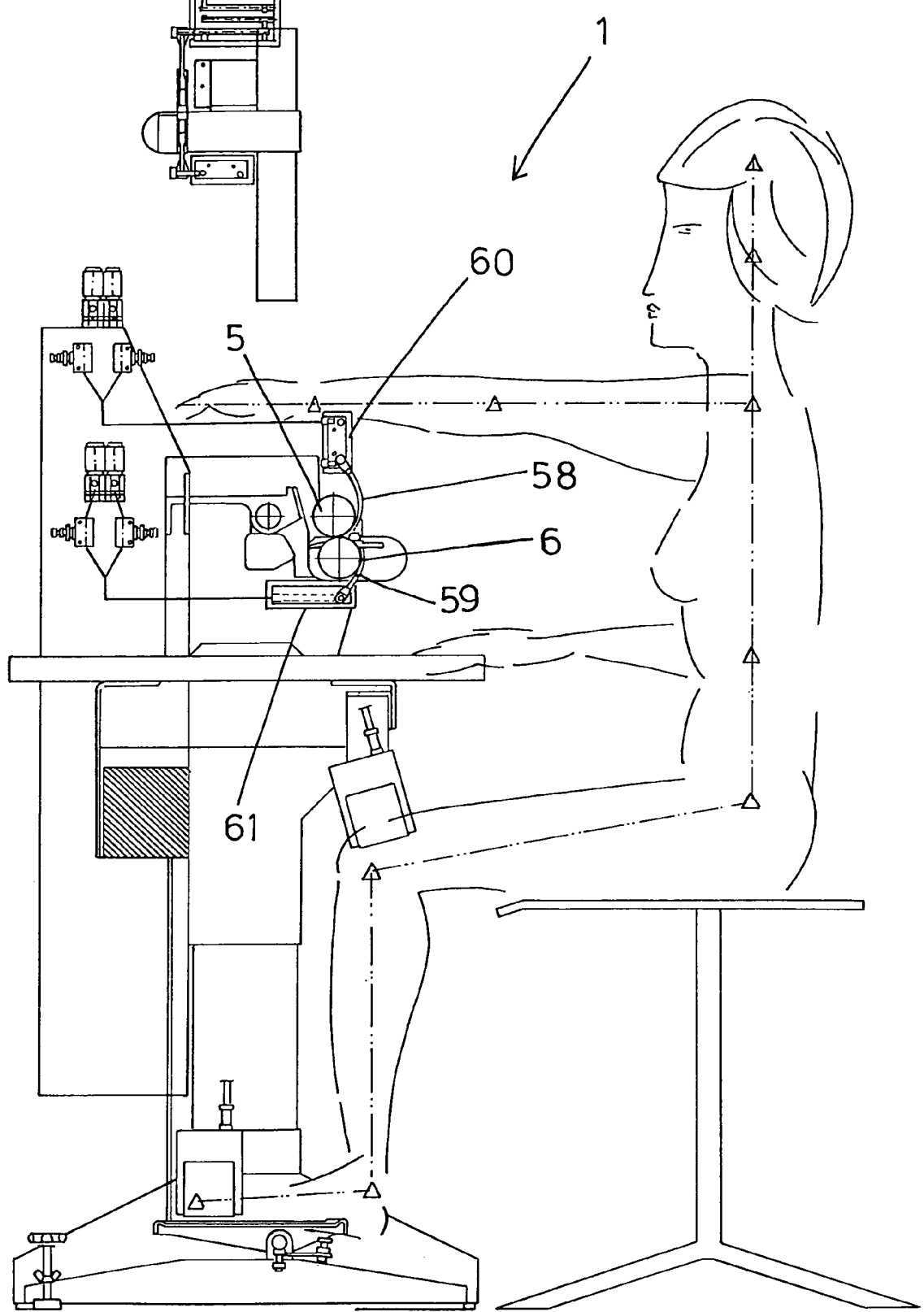
FIG. 9 shows the apparatus according to the present invention and, more specifically, shows the heating means associated with said apparatus.
Figure 10:
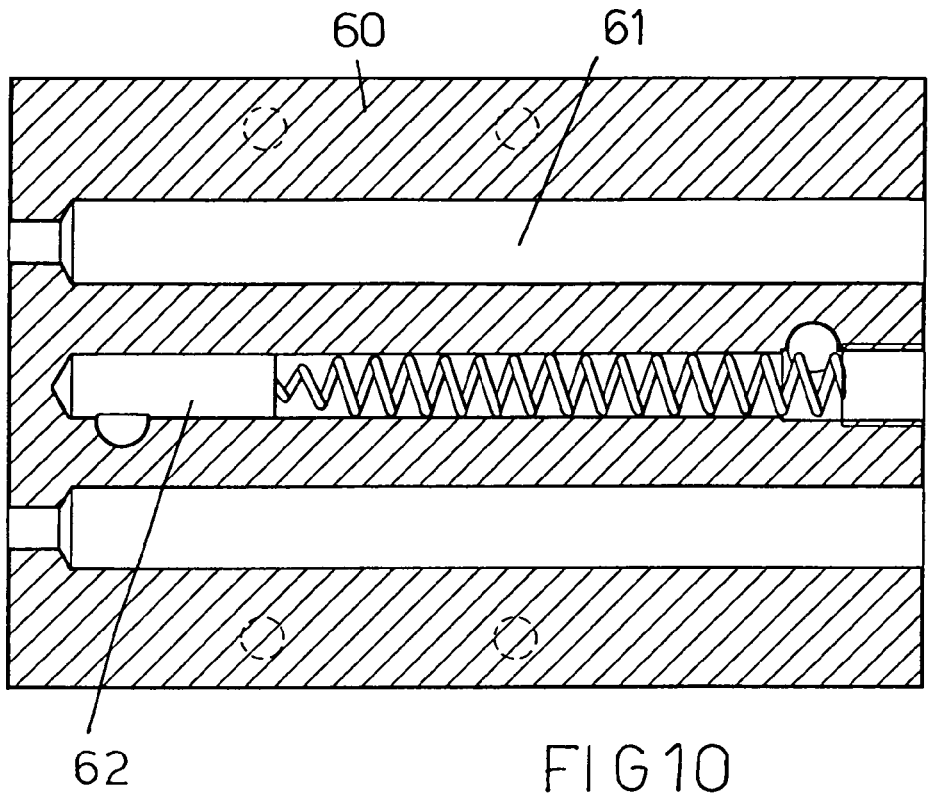
FIGS. 10 and 11 show, as cross-sectioned in two different cross-section planes, the heating means included in the apparatus according to the invention.

As shown in FIG. 8, the trimming means comprise a rotary blade element 50, applied at the above mentioned bottom wheel 6 and cooperating with a counter-blade element 51 provided for performing trimming operations at a suction or inlet mouth 52 of a tube 53 for moving away the trimmed material.

At the application region are further provided a top nozzle 58 and a bottom nozzle 59 providing hot air jets, operating for actuating adhesive materials provided on the strips, thereby allowing said strips to be easily coupled.

To perform the heating operation, a plate 60, preferably made of an aluminium material is herein provided, said plate 60 being electrically heated, and including a plurality of ducts 61 including bronze filter 62 thereon, in which air is heated and delivered through the delivery nozzle 58 directly to the top portion or surface of the fabric material.

Figure 11:
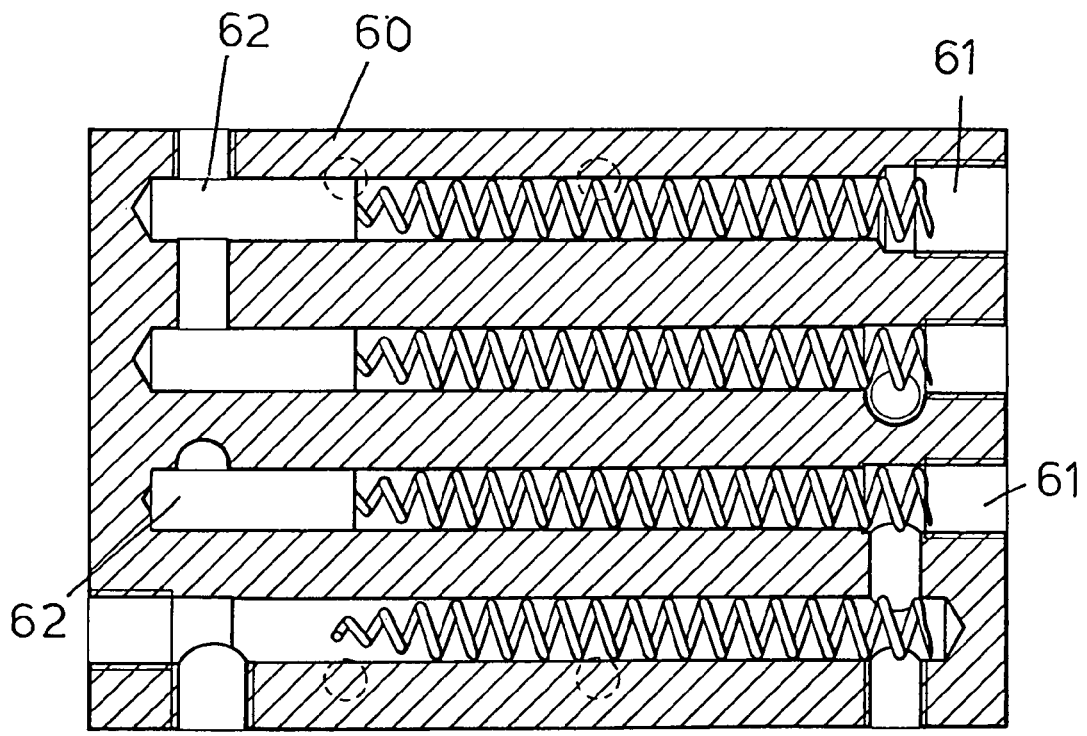
Figure 12:
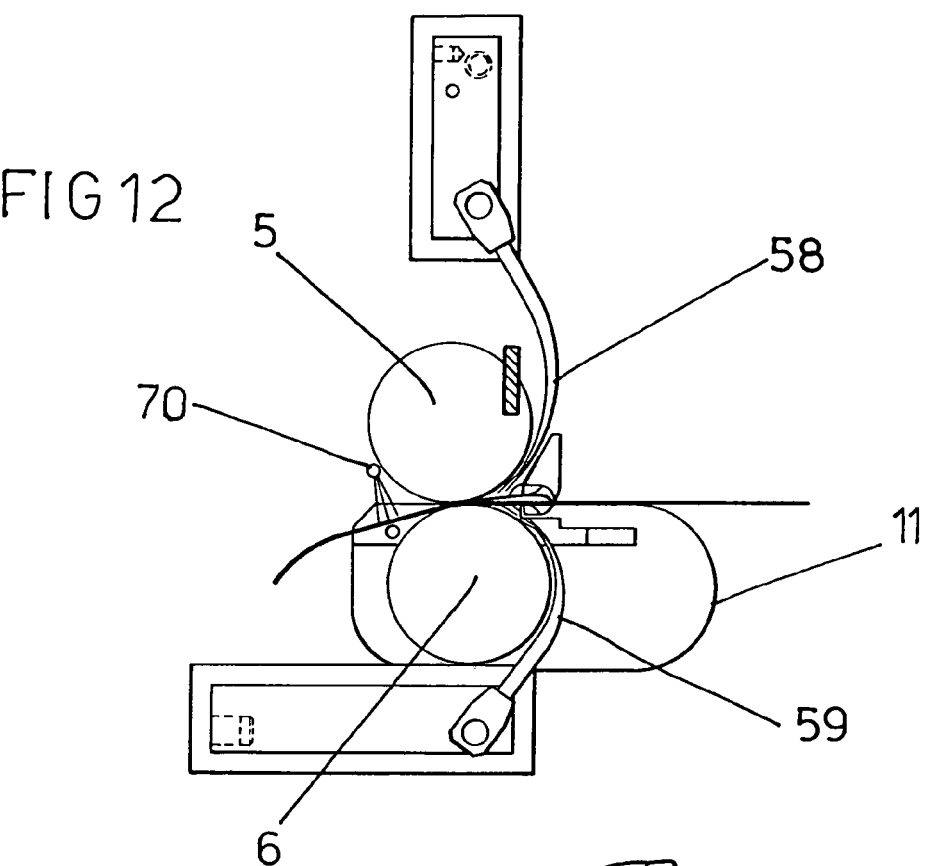
FIG. 12 schematically shows the hot air inlet nozzles.
Figure 13:
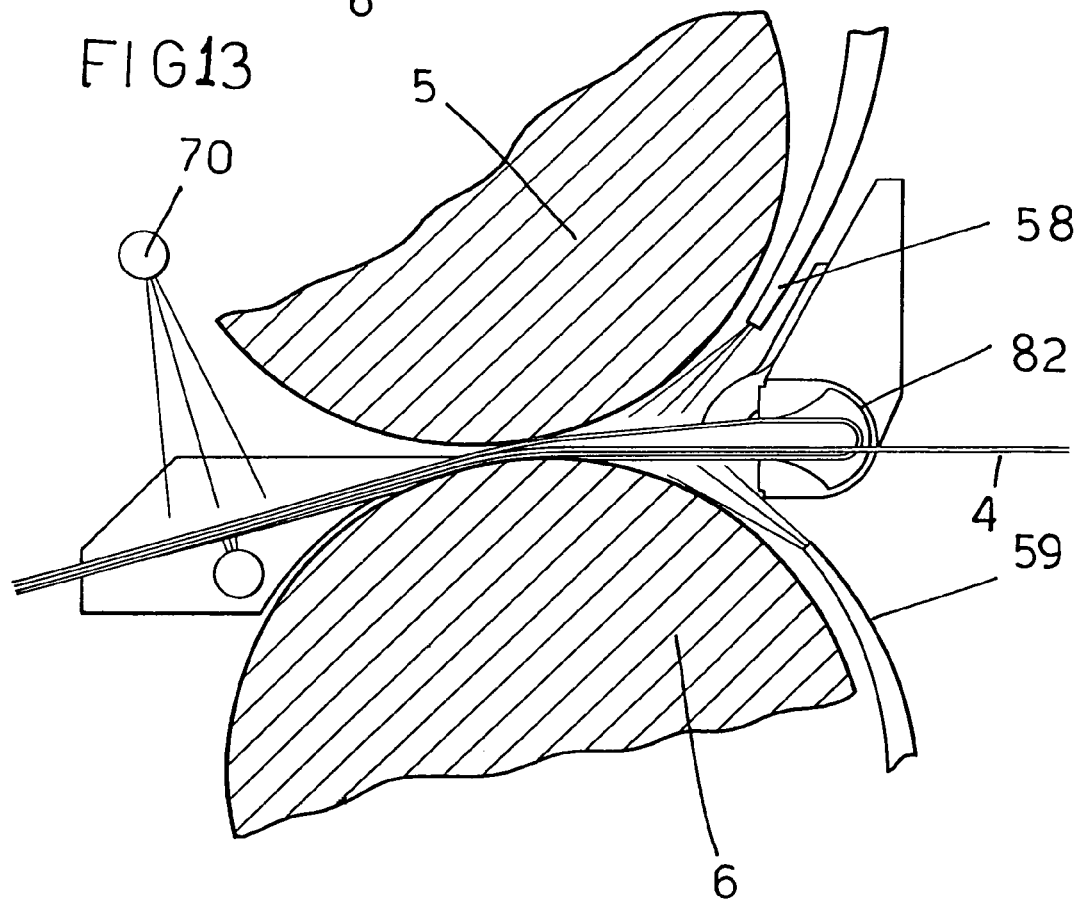
FIG. 13 shows, on an enlarged scale, the hot air inlet nozzles.

Likewise, as is shown in FIG. 11, an analogous plate, indicated by the same reference numbers, is herein provided, communicating the bottom delivery nozzle, for heating the bottom portion of the fabric material.

Thus, the subject apparatus allows to independently perform a setting of the top air jet temperature, and this is achieved as the operator adjusts an adjustable potentiometer.

Moreover, on said plate is moreover provided a temperature sensing probe, designed for sensing and holding constant a set temperature, through an electronic controller.

A like control being performed at the above disclosed bottom plate.

In particular, the apparatus allows to easily adjust the air flow rate of the air delivery top jet, depending on the operating speed of the apparatus.

More specifically, the inlet air flow rate is automatically adjusted, by a pedal driven device, and operating by progressive steps.

At a first step, an electrovalve or solenoid valve, set at a 50% rate is opened, and at a second step a 100% open solenoid valve is opened, whereas at a fourth and fifth step, both said solenoid valves are opened.

A like adjustment is carried out with respect to the above mentioned bottom nozzle.

An electronic system for actuating the top and bottom air jets are herein provided, which comprises an optic fiber photocell which, as it is covered, will energize the air jet, which is actuated as the fabric material feeding wheels are operated and being deactuated as said fabric feeding wheels are caused to stop.

The subject apparatus comprises, moreover, a piece cooling system, including a blowing nozzle 70, arranged at a rear portion of the apparatus.

The apparatus furthermore comprises a web cutting system for separating the processed workpieces, said cutting system being shown in FIG. 14 and comprising cutting blade elements 71 which is driven by a pneumatic driving cylinder 72 allowing the web or edge to be easily cut.

The cutting operation can be performed either by a manual command or, optionally, by using two drive photocells 73 and 74, which are respectively arranged before and after said wheels 5 and 6.

Thus, as the workpiece uncovers the first photocells 73, the apparatus 1 starts to operate at a fixed transfer speed, to cause the second photocell 74 to be also uncovered, thereby actuating a precise cutting operation, since the space traversed in a given time is accurately detected or sensed.

For applying the strip 4, it is possible to properly change the strip or web tension, depending on the fabric type, the bending radius and other variables.

The above mentioned tension variations can also be changed during the application operation, on the same fabric piece, depending on the bending-folding or cutting of the fabric itself.

To meet the above requirements, a specifically designed apparatus allowing to properly change the strip tension and properly program the above variations depending on the workpiece feeding has been herein included.

More specifically, this apparatus or device substantially comprise a driven strip feeder, which is controlled by a load cell, an electronic controller including membrane keyboard control panels, and a roll, coil or box packaged strip support 110, as suitably arranged, as well as a knee drive, for energizing a programmed tension sequence.

Moreover, as is clearly shown in FIGS. 15 and 16, it is possible to also provide a hemming assembly 80 including a central core 81 for allowing the adhesive strip to pass therethrough.

Said core, for a portion thereof, is arranged adjoining a turning edge element 82, provided for turning up the fabric material T on the adhesive strip.

The assembly comprises moreover preheating elements for preheating the guide assembly which, in particular, comprise hot air blowing nozzles for blowing hot air on the fabric material top portion or surface.

Figure 18:
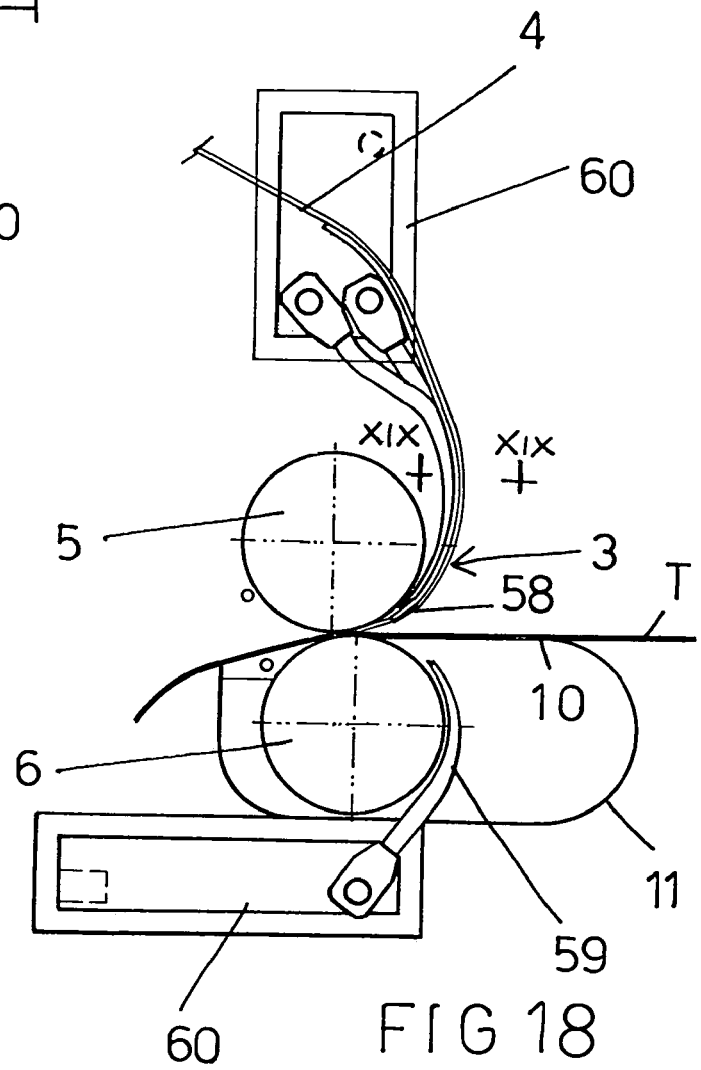
FIG. 18 is a schematic view illustrating the preheating means for preheating the strip guide.
Figure 19:
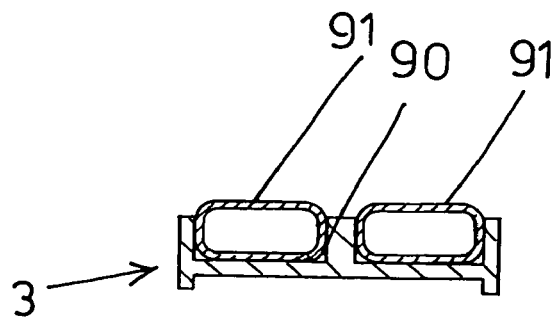
FIG. 19 is a cross-sectional view of the apparatus, substantially taken along the cross-line XIX-XIX of FIG. 18.
Figure 20:
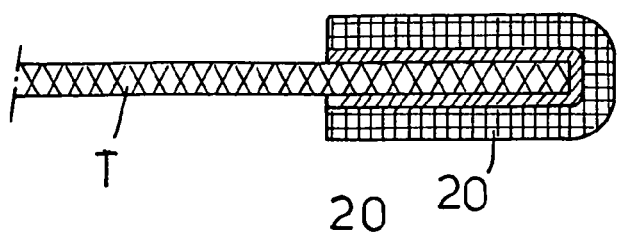
FIG. 20 is a further cross-sectional view illustrating the fabric material, during a hemming or edging operation, in which said fabric material is provided with a self-adhesive strip.
Figure 21:
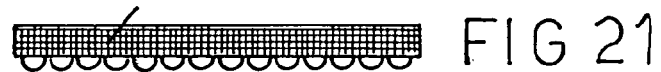
FIG. 21 illustrates a single-adhesive fabric hemming or edging strip.

Said preheating means comprise recesses 90 defined on a rear face of the guide 3, in which are housed ducts 91 leading to the top nozzle thereby providing a preheating operation, as shown in FIG. 18.

Figure 17:
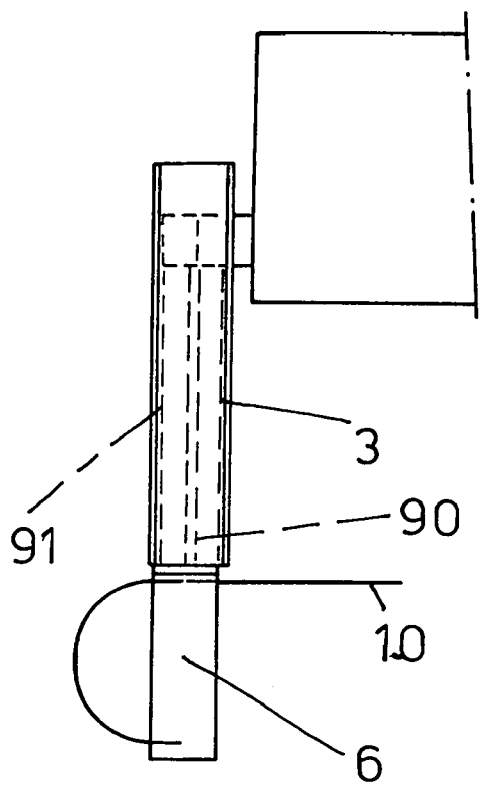
FIG. 17 is a schematic view showing the trimming means included in the apparatus according to the present invention.

In FIG. 17, the disclosed type of heating is provided on an apparatus or machine.

Figure 32:
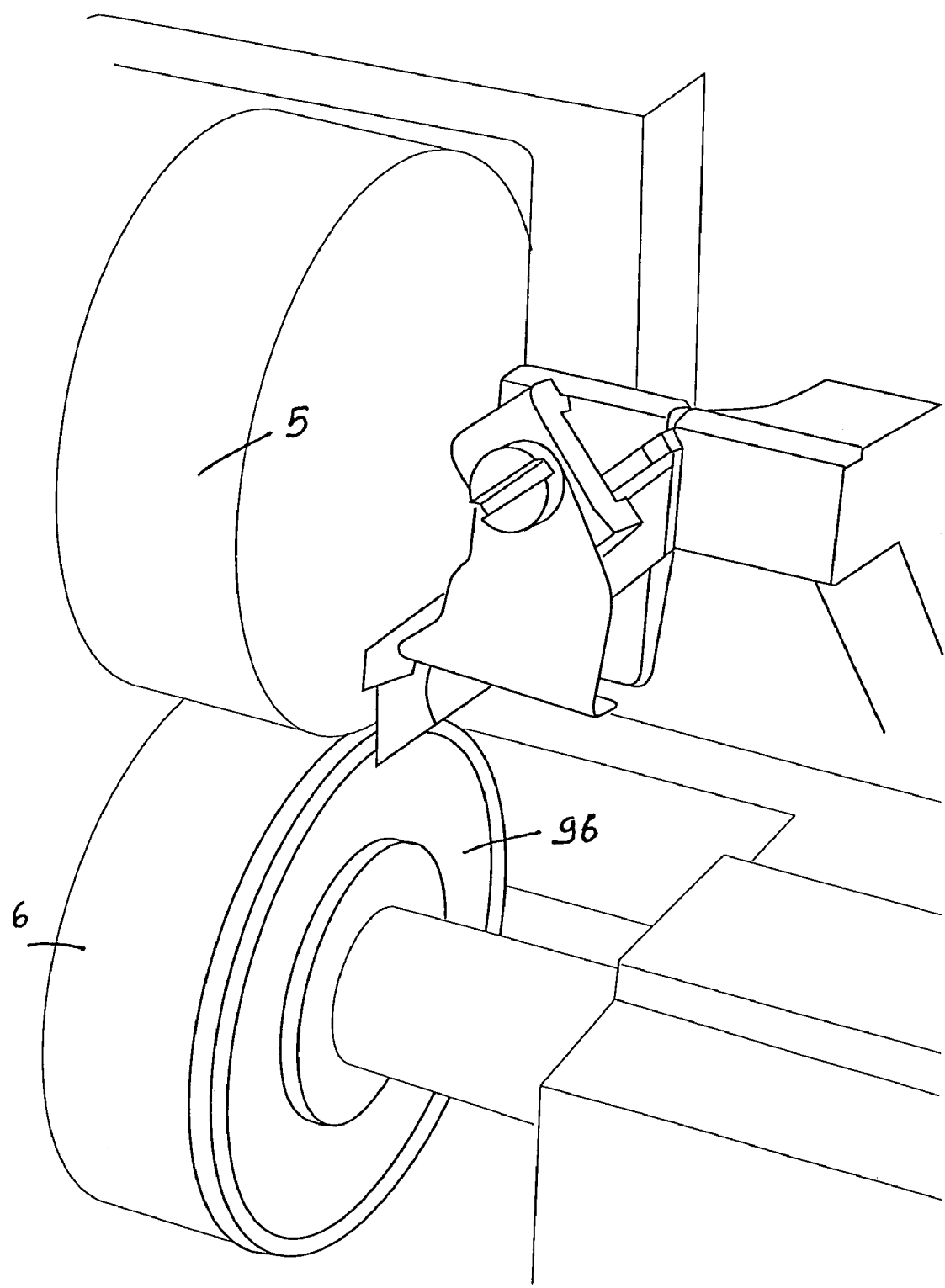
FIG. 32 is a front side perspective view showing features of a trimming blade or knife element used on an applied edge portion.

The latter, as shown in FIG. 32 further comprises a trimming blade element 95 operating in contact with a disc blade element 96.

In this connection it should be moreover pointed out that, as is shown in FIG. 34, the present invention also provides a machine or apparatus adapted to finish a fabric material edge without performing seaming operations and at a very reduced thickness, so as to provide a textile hand and a good and long duration resilient property.

The subject apparatus allows, by using several inter-exchangeable fittings, to provide different finishing operations, comprising an edging or hemming operations, or an edge applying operation.

In particular, the edging operation provides to use a mono-adhesive fabric strip including spot applied adhesive materials or a casing resilient element including a single or mono-adhesive spotted adhesive material, thereby coating, at the two fabric surfaces, the fabric end portions.

A second finishing operation, performed by a hemming operation proper, can be carried out by using a continuous bi-adhesive film, arranged between and end portion of the fabric, which is upturned and caused to adhere to the above mentioned bi-adhesive film.

Said hemming operation can also be carried out by using a resilient or elastic element provided with a double-adhesive spotted pattern, which is arranged at the fabric material peripheral portion and which is turned through 180°, thereby causing its two end portions to adhere to the above mentioned double adhesive spotted resilient element.

A third finishing system is carried out by applying an edge portion, according to a lot of different application methods.

In a first method, to the fabric material a continuous mono-adhesive film is applied at an end surface of said fabric material.

In a second modified embodiment, the fabric material is finished, at a side edge thereof, by a fabric material strip supporting a mono-adhesive spotted adhesive material; in a third modified embodiment, the edge is applied to the fabric material by using an elastic element supporting a mono-adhesive spotted adhesive material.

Moreover, the apparatus according to the present invention can also use a continuous adhesive film which can be of a single adhesive type or of a bi-adhesive type or it can also use fabric strips or elastic elements to which an adhesive material is spot applied.

Furthermore, the above mentioned fabric strips or elastic elements 4 can also be provided of a spotted adhesive material, either of a mono-adhesive type or of a bi-adhesive type.

Figure 33:
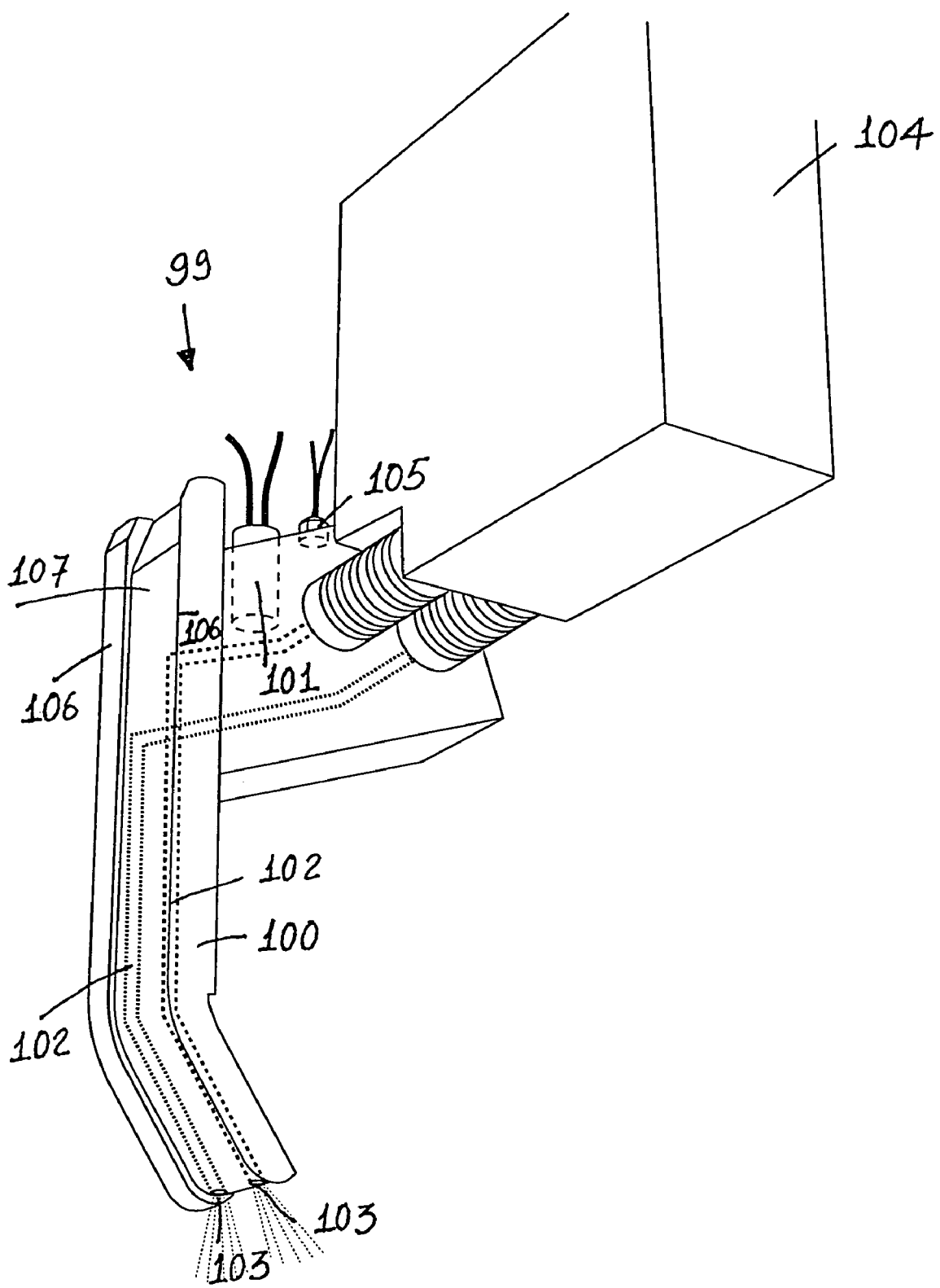
FIG. 33 is a front side perspective view showing a heating device and specifically designed or dedicated guide for guiding a fabric or elastic material or film strip to be applied to a garment to be made.

FIG. 33 shows a detail view of a modified embodiment of the device 99 for heating the material strip 4 to be applied to a textile article of manufacture, to finishing without seams an edge of the fabric material.

Said FIG. 33 shows a sliding guide 100 for slidingly guiding the material strip to be applied to the fabric to be finished, which guide includes an electric resistance 101 designed for heating the mass of the material forming said sliding guide 100.

In said sliding guide 100 are moreover provided two delivery ducts 102, designed for delivering hot air exiting an end portion 103.

Said hot air delivery ducts 102 are coupled to a heater device 104, including a temperature control termistor 105.

Said temperature control termistor 105 allows to accurately adjust the temperature of said guide, by using a heating electric resistance, which can be switched on or off, as a set temperature is achieved.

Said electric resistance 101, in particular, operates as a preheating element for preheating the adhesive strip sliding guide, said adhesive strip being slidably longitudinally fed along said guide, the side walls 106 of said guide projecting from the middle portion thereof.

From the above disclosure it should be apparent that the invention fully achieves the intended aim and objects.

In particular, the fact is to be pointed out that the invention provides an apparatus allowing to perform, in a fully automatic manner, finishing operations on a fabric edge portion, by performing edging, hemming operations or by flat applying a stabilizing material strip.

In all the disclosed embodiments, no seaming operation is used, and the contact with the user skin is always performed through fabric elements, provided with spot-applied adhesive materials, thereby no damage to the user skin is caused.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. An apparatus for hemming a garment fabric edge, said apparatus comprising a bearing framework supporting a guide element for guiding an adhesive strip to a top wheel and a bottom wheel, said top and bottom wheels operating on an edge portion of a fabric material for applying said adhesive strip to said edge portion, heating means for heating said adhesive strip to apply said adhesive strip to said edge portion of said fabric material, wherein said apparatus further comprises cooling means for cooling said edge portion having said adhesive strip applied thereto, wherein said top wheel is supported by a swinging lever driven by a driving piston adapted to raise said top wheel and adjust a pressure applied to said top wheel, and wherein said apparatus is adapted to operate in a first, a second and third mode of operation, in said first mode of operation said apparatus flat applying said adhesive strip to said edge portion, said adhesive strip comprising a mono-adhesive film or a mono-adhesive fabric material, in said second mode of operation said apparatus using a single-adhesive fabric strip which is folded with a bridging relationship on said edge portion, and in said third mode of operation said apparatus folding said edge portion and introducing thereinto a bi-adhesive said strip.

2. An apparatus, according to claim 1, wherein said apparatus further comprises trimming means including a rotary blade element applied to said bottom wheel and cooperating with a trimming counter-blade element, and a suction mouth portion for removing a trimmed material trimmed away by said trimming means.

3. An apparatus, according to claim 1, wherein said heating means comprise a top nozzle and a bottom nozzle, for delivering hot air jets to said adhesive strip, said heating means comprising, for each said top and bottom nozzle, an electrically heated aluminium plate, comprising a plurality of ducts in which a corresponding plurality of bronze filters for heating air are arranged.

4. An apparatus, according to claim 3, wherein said heating means comprise a top heating plate and a bottom heating plate.

5. An apparatus, according to claim 1, wherein said cooling means comprise a blowing nozzle arranged at a rear portion of said apparatus.

6. An apparatus, according to claim 1, wherein said apparatus comprises moreover cutting means for cutting said strip, said cutting means comprising a cutting blade element driven by a pneumatic cylinder.

7. An apparatus, according to claim 1, wherein said apparatus comprises moreover a first and a second photocells arranged respectively upstream and downstream of said cutting blade element driving wheels.

8. An apparatus, according to claim 1, wherein said apparatus comprises moreover strip tension changing means for changing a tension of said strip depending on a workpiece feeding movement.

9. An apparatus, according to claim 1, wherein said apparatus comprises moreover preheating means for preheating guide means, comprising nozzle supplying ducts, arranged in recesses formed on a rear face of said guide.

10. An apparatus, according to claim 1, wherein said apparatus comprises moreover a hemming assembly including a central core for allowing an adhesive strip to pass therethrough, and an hemming edge portion adjoining for a length said central core.

11. An apparatus, according to claim 1, wherein said heating means comprise a sliding guide for said adhesive strip, said sliding guide including an electric resistance for heating a material mass forming said sliding guide, in said sliding guide being provided two hot air delivery ducts, for delivering hot air from an end portion of said guide.

12. An apparatus, according to claim 11, wherein said hot air delivery ducts are coupled to a heating device including a temperature control termistor.

* * * * *